United States Patent
Adler et al.

(10) Patent No.: US 11,455,700 B2
(45) Date of Patent: *Sep. 27, 2022

(54) SHORTCODE FOR AUTOMATING APPLICATION PROCESSES

(71) Applicant: GT Gettaxi Limited, Limassol H.E. (CY)

(72) Inventors: Tal Adler, Tel Aviv (IL); Nadav Lichter, Tel Aviv (IL)

(73) Assignee: GT Gettaxi Systems Ltd, Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/729,093

(22) Filed: Dec. 27, 2019

(65) Prior Publication Data

US 2020/0134769 A1    Apr. 30, 2020

Related U.S. Application Data

(63) Continuation of application No. 15/138,595, filed on Apr. 26, 2016, now Pat. No. 10,546,359.

(51) Int. Cl.
*G06Q 50/32* (2012.01)
*G06Q 30/06* (2012.01)
(Continued)

(52) U.S. Cl.
CPC .......... *G06Q 50/32* (2013.01); *G06F 3/0482* (2013.01); *G06Q 10/02* (2013.01); *G06Q 10/06* (2013.01);
(Continued)

(58) Field of Classification Search
CPC ........ G06Q 50/32; G06Q 10/02; G06Q 10/06; G06Q 30/0635; G06F 3/0482; H04L 67/42; H04L 67/01
See application file for complete search history.

(56) References Cited

U.S. PATENT DOCUMENTS 6,144,650 A   11/2000 Watanabe et al.
7,245,929 B2   7/2007 Henderson et al.
(Continued)

FOREIGN PATENT DOCUMENTS

| EP | 2843598 A1 | 3/2015 |
| RU | 103952 U1 | 4/2011 |
| RU | 126493 U1 | 3/2013 |

OTHER PUBLICATIONS

Da-mee, Yoon, "Bus arrival times available from QR code at bus stops," The Korea Times, Seoul, Jan. 20, 2011.*

(Continued)

*Primary Examiner* — Nathan Erb
(74) *Attorney, Agent, or Firm* — Lowenstein Sandler LLP

(57) ABSTRACT

A method includes, responsive to receiving a shortcode from a client computing device, identifying, by a processing device based on the shortcode, computer-executable instructions and one or more geographical locations. The method further includes causing, based on the computer-executable instructions and the one or more geographical locations, the client computing device to generate an order request form filled with the one or more geographical locations received from the processing device based on the shortcode without user intervention and without user input of the one or more geographical locations. The method includes, responsive to receiving the order request form filled with the one or more geographical locations from the client computing device, transmitting, to a vehicle computing device, an order request to dispatch a transportation vehicle associated with the vehicle computing device to provide a transportation service to a user of the client computing device based on the order request form.

20 Claims, 13 Drawing Sheets

Related U.S. Application Data

(60) Provisional application No. 62/153,222, filed on Apr. 27, 2015.

(51) Int. Cl.
*G06F 3/0482* (2013.01)
*G06Q 10/06* (2012.01)
*G06Q 10/02* (2012.01)
*H04L 67/01* (2022.01)

(52) U.S. Cl.
CPC ......... *G06Q 30/0635* (2013.01); *H04L 67/01* (2022.05)

(56) References Cited

U.S. PATENT DOCUMENTS

| | | | |
|---|---|---|---|
| 7,356,337 | B2 | 4/2008 | Florence |
| 7,363,233 | B1* | 4/2008 | Levine .................. G06Q 10/04 705/1.1 |
| 8,099,114 | B2 | 1/2012 | Midkiff et al. |
| 8,195,509 | B1 | 6/2012 | Mhatre et al. |
| 8,374,636 | B2 | 2/2013 | McDonough |
| 8,467,814 | B2 | 6/2013 | Gan et al. |
| 8,798,585 | B2 | 8/2014 | McDonough |
| 9,202,213 | B2 | 12/2015 | Gromoll et al. |
| 10,546,359 | B2* | 1/2020 | Adler ................. G06Q 30/0635 |
| 2006/0068786 | A1 | 3/2006 | Florence |
| 2006/0271696 | A1 | 11/2006 | Chen et al. |
| 2007/0010265 | A1 | 1/2007 | Henderson et al. |
| 2008/0133124 | A1* | 6/2008 | Sarkeshik .......... G01C 21/3611 701/533 |
| 2008/0183828 | A1 | 7/2008 | Sehgal et al. |
| 2008/0247363 | A1 | 10/2008 | Lee et al. |
| 2008/0305815 | A1 | 12/2008 | McDonough |
| 2009/0069037 | A1 | 3/2009 | Gan et al. |
| 2009/0106770 | A1 | 4/2009 | Gan et al. |
| 2009/0138374 | A1* | 5/2009 | Cohen .................... G06Q 40/04 705/26.1 |
| 2009/0144260 | A1* | 6/2009 | Bennett ............... G06F 16/3343 |
| 2009/0156181 | A1 | 6/2009 | Athsani et al. |
| 2011/0202982 | A1 | 8/2011 | Alexander et al. |
| 2011/0320232 | A1 | 12/2011 | Staffaroni et al. |
| 2012/0055983 | A1 | 3/2012 | Wellborn et al. |
| 2012/0083287 | A1* | 4/2012 | Casto ...................... H04W 4/12 455/456.1 |
| 2012/0117162 | A1 | 5/2012 | McAleer |
| 2012/0179536 | A1 | 7/2012 | Kalb et al. |
| 2012/0203638 | A1 | 8/2012 | Kaplan |
| 2013/0124211 | A1 | 5/2013 | McDonough |
| 2013/0124413 | A1 | 5/2013 | Itwaru |
| 2013/0262268 | A1 | 10/2013 | Gromoll et al. |
| 2013/0275264 | A1 | 10/2013 | Lindenberg |
| 2014/0007220 | A1 | 1/2014 | Pepin |
| 2014/0074895 | A1 | 3/2014 | Ingerman et al. |
| 2014/0100933 | A1 | 4/2014 | Schwartz |
| 2014/0149286 | A1 | 5/2014 | Forsyth |
| 2014/0156369 | A1 | 6/2014 | Circe |
| 2014/0244496 | A1 | 8/2014 | Langus et al. |
| 2014/0358690 | A1 | 12/2014 | Mueller et al. |
| 2015/0019998 | A1 | 1/2015 | McDonough |
| 2015/0178784 | A1 | 6/2015 | Oliver et al. |
| 2015/0223024 | A1 | 8/2015 | Abuodeh |
| 2015/0235199 | A1 | 8/2015 | Lindenberg |
| 2015/0248670 | A1 | 9/2015 | Langus et al. |
| 2015/0269558 | A1 | 9/2015 | Basnet |
| 2015/0365420 | A1 | 12/2015 | Kochhar |
| 2016/0112533 | A1 | 4/2016 | Rich, Jr. et al. |
| 2016/0164824 | A1 | 6/2016 | Kalyanaraman et al. |
| 2016/0267618 | A1* | 9/2016 | Baek ...................... G06Q 50/32 |
| 2017/0193565 | A1 | 7/2017 | Meyer et al. |
| 2017/0249666 | A1 | 8/2017 | Babcock et al. |
| 2020/0134769 | A1* | 4/2020 | Adler ................. G06Q 30/0635 |

OTHER PUBLICATIONS

Non-Final Office Action dated Oct. 2, 2018, on U.S. Appl. No. 15/138,595.
Final Office Action dated May 31, 2019, on U.S. Appl. No. 15/138,595.
Notice of Allowance dated Sep. 9, 2019, on U.S. Appl. No. 15/138,595.
European Search Report dated Jun. 17, 2016, on application No. 16 167 166.
Costa-Montenegro, Enrique, et al. "QR-Maps: An efficient tool for indoor user location based on QR-Codes and Google maps." Consumer Communications and Networking Conference (CCNC), 2011 IEEE.
European Office Action dated Jul. 20, 2017 on application No. 16 167 166.4.
Anipindi, Kalyani, Quick Ride Match System: Design and Implementation of an Efficient, Interactive, We Based Rideshare Matchup System, The University of Texas at Arlington, May 2001.
Russian Search Report on application No. 2016116509/08(025912), dated Aug. 3, 2017.

* cited by examiner

SHORTCODE FOR AUTOMATING APPLICATION PROCESSES

RELATED APPLICATION

This patent application is a continuation of U.S. patent application Ser. No. 15/138,595, filed Apr. 26, 2016, which claims benefit of Provisional Patent Application No. 62/153,222, filed on Apr. 27, 2015, the entire contents of both are hereby incorporated by reference.

BACKGROUND

Customers use smart phone application interfaces to order services. Customers can fill out order forms to request services. The services include transportation services, such as ridesharing and taxi services. The services may also include delivery services, courier services, or other types of services where a delivery person and/or a transportation vehicle are dispatched to provide a requested service. The smart phone application interfaces may allow users to request a pick-up by a driver of a transportation vehicle, cancellation of the request, and payment for the service.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
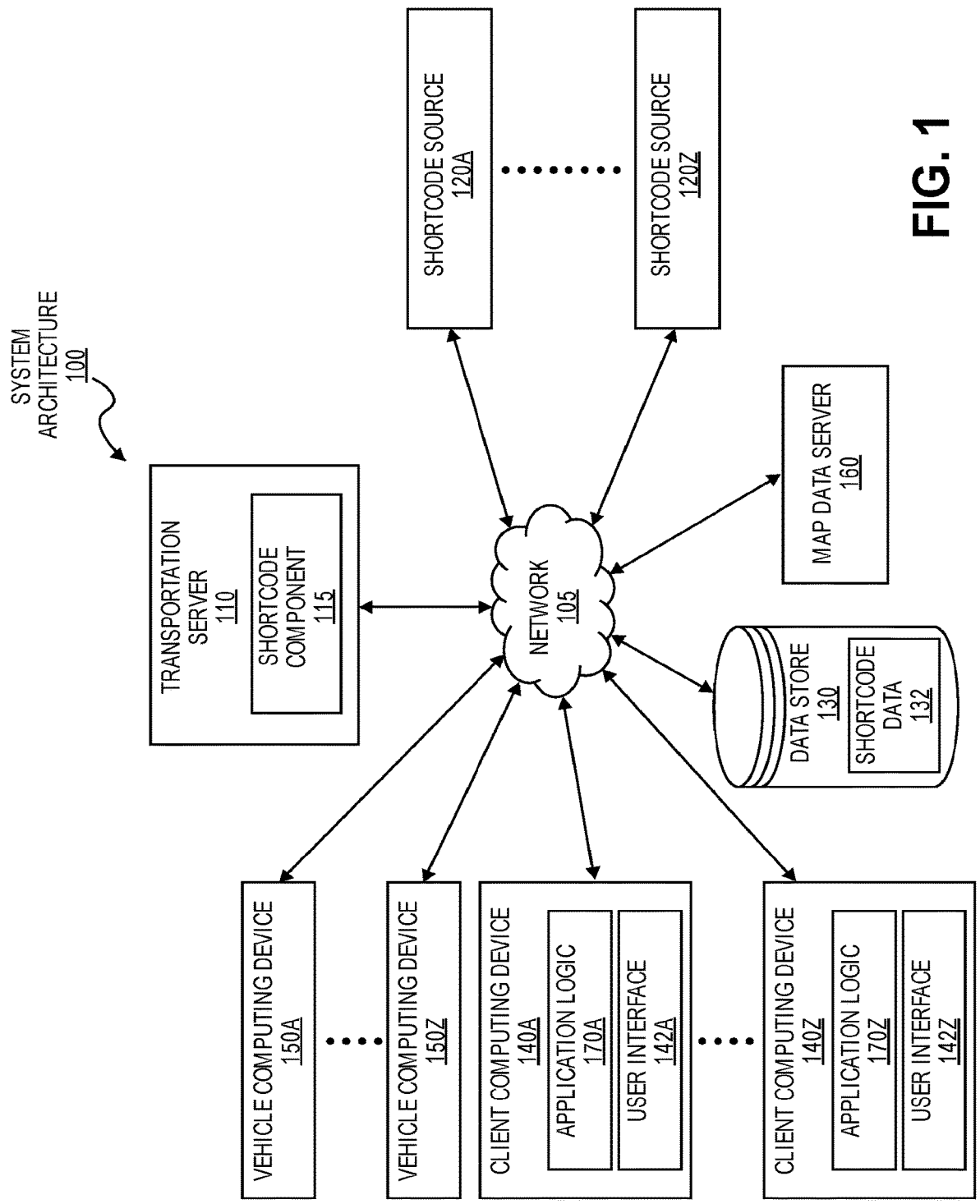
FIG. 1 illustrates an example system architecture, in accordance with an implementation of the disclosure.

Described herein are systems and methods for using shortcodes for automating application processes. In one implementation, a shortcode includes multiple characters arranged in a particular order. The shortcode may include a string of textual (i.e., alphanumeric) and/or numerical characters that are used to automate certain processes in a product or service and/or inject specific content at the product from remote servers. The shortcode may start with a hashtag symbol (e.g., pound symbol or "#") or may start with other symbols as well. The product may include an application (e.g., an app) installed on a client computing device (e.g., smartphone, cell phone etc.). In one implementation, the shortcode may be associated with a service associated with a server computing device, such as a delivery service or other type of service providing a product or other transaction.

The described implementations of the disclosure allow users to order services (e.g., transportation vehicles, delivery of goods and other services) more efficiently using a client computing device, such as a smart phone or other mobile computing device. To use a shortcode, the user may be prompted to enter a specific shortcode into the app (e.g., #locationname). In some implementations, the shortcode may be captured and entered into the shortcode using a camera or other input device of the mobile computing device. The shortcode is sent to a server computing device and is compared with a listing of shortcodes maintained on the server device. When a match between the transmitted shortcode and another shortcode in the listing is found, actions and content associated with the shortcode are identified and transmitted to the client computing device.

In response, an order request form on a screen of the app may open directly with pre-filled content (e.g., pickup and/or destination address) generated in view of the transmitted content. The list of actions includes computer-executable instructions that cause the order request form to be automatically generated on the client computing device without user intervention. The user may then confirm (or edit) the pre-filled information in the ordering screen to order a service (e.g., a transportation vehicle for pick-up or drop-off) at a geographical location associated with the shortcode and/or the client computing device. The user may be able to request and view the information about the ordered transportation vehicle (e.g., estimated time of arrival (ETA), driver name, driver phone number, make/model of vehicle, rates or costs to user the vehicle, etc.) using the mobile application.

It is noted that implementations involving a shortcode to automate application processes are illustrative, and that other methods of carrying out the described implementations may be used, such as using a shortcode to obtain monetary credit (e.g., applying a coupon to a user account) in the application or to automate a food delivery process of the application.

Previous solutions for ordering a service using a form involve a great deal of user input. The user may be prompted to enter an origination address, a destination address and additional information in order to order a service. Further-more, if the user wishes to use a discount code, the user may have to enter additional information to receive a discount. The user may find that manually entering such information into his/her smart phone is cumbersome and complex. Further, if the user is in a foreign location when he/she wishes to order a service, the user may not be familiar with his/her origination address or the destination address, or may have difficulty entering such information in a different language. In addition, user entry of order request form information may be prone to user error, thus unnecessarily delaying the overall order process for the service.

Implementations of the disclosure address the shortcomings of the previous solutions by providing a service using an order request form that simplifies the ordering process by using shortcodes. A shortcode, which includes multiple characters arranged in an order, is associated with a service of the server computing device. The shortcode is used by the client computing device to instantiate a process to generate an order request form without user intervention. The service may then be provided to the user based on the order request form. By using a shortcode to order a service via an order request form that is generated based on the shortcode, the service is ordered efficiently and with accuracy. Therefore, implementations of the disclosure reduce the possibility of user error, increase the speed of the ordering process and improve overall user experience when ordering a service using a shortcode.

FIG. 1 illustrates an example system architecture 100, in accordance with an implementation of the disclosure. The system architecture 100 includes a transportation server 110, shortcode source 120A-120Z, a data store 130, vehicle computing devices 150A-150Z, client computing devices 140A-140Z, and a map data server 160. The components 110-160 may be communicatively connected via a network 105, which is described in greater detail below.

The client computing devices 140A-140Z each include respective application logic 170A-170Z. The application logic 170A-170Z includes logic for performing processes of implementations of the disclosure.

In one implementation, the transportation server 110 and the map data server 160 may each correspond to one or more computing devices (e.g., a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The transportation server 110 may include a shortcode component 115 (which may be executed by a processing device of the transportation server 110) that is capable of receiving shortcodes from client computing devices 140A-140Z and comparing the shortcodes to a listing of shortcodes to find a match. Use of the shortcodes to enable application logic 170A-170Z of client computing devices 140A-140Z to generate an order request form (e.g., a transportation order request, etc.) to order a service of the transportation server 110. The transportation server 110, after receiving the order request form from client computing devices 140A-140Z, may also be capable of transmitting order requests to the vehicle computing devices 150A-150Z, dispatching transportation vehicles (e.g., a taxis), and performing location tracking of the transportation vehicles. The transportation server 110 may also offer additional services such as delivery services, discounted services, and so on, and is not limited to providing transportation services.

In some implementations, the shortcode component 115 may be implemented on a different device than transportation server 110. For example, in some implementations, one or more of the shortcode sources 120A-120Z and/or client computing devices 140A-140Z may implement the shortcode component 115 (or at least some of the functionality of the shortcode component 115). In some implementations, some or all of the functionality of the shortcode component 115 may be distributed across one or more of the shortcode sources 120A-120Z, one or more of the client computing devices 140A-140Z, and/or one or more of the vehicle computing devices 150A-150Z. In some implementations, the transportation server 110 may be omitted from the system architecture 100. In some implementations, more than one transportation server 110 may be included in the system architecture 100.

In one implementation, the map data server 160 includes map data for a variety of locations (e.g., city maps), as well as real-time traffic conditions, detours (e.g., due to construction), etc. The map data server 160 may provide map data to one or more devices within the system architecture 100 via the network 105. In some implementations, the transportation server 110 may receive map data from the map data server 160, which may be used to compute an estimated time of arrival (ETA) for a transportation vehicle to arrive at a particular location (e.g., a location of one of the shortcode source 120A-120Z).

In one implementation, each of the shortcode sources 120A-120Z may be any of variety of physical realizations. For example, the shortcode source 120A-120Z may be as simple as a sticker or placard imparting text or other communication measures (e.g., QR code, etc.) to someone who views the shortcode source 120A-120Z. In other implementations, the shortcode source 120A-120Z may be a public computer terminal or other computing device (e.g., a near-field communication (NFC) device) that provides a shortcode (e.g., either directly or in response to a look-up process initiated by a user). A shortcode source 120A-120Z may be located at a public destination, such as a restaurant, mall, movie theater, entertainment destination, and so on.

Figure 8:
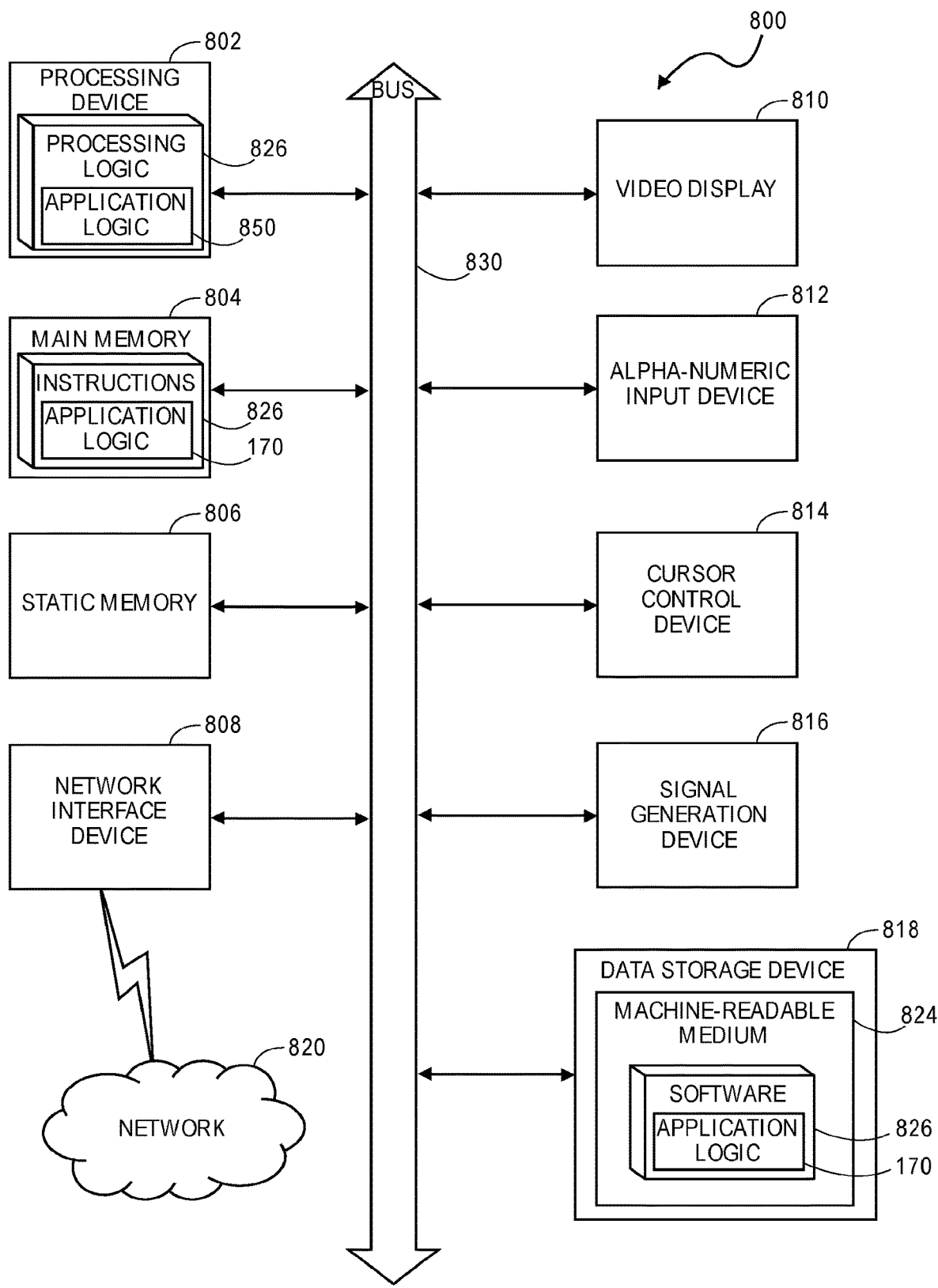
FIG. 8 illustrates a diagrammatic representation of another machine in the example form of a computer system, in accordance with an implementation of the disclosure.

In one implementation, a shortcode is entered directly into a user interface (or a graphical user interface) provided by the client computing devices 140A-140Z. The client computing devices 140A-140Z may each implement one of user interfaces 142A-142Z. A user interface may be rendered on a display device (e.g., a video display 810 as shown in FIG. 8) of the client computing devices 140A-140Z. Client computing devices 140A-140Z may include computing devices such as personal computers (PCs), laptops, mobile phones, smart phones, tablet computers, netbook computers, etc. The client computing devices 140A-140Z may also be referred to as "user devices". An individual user may be associated with (e.g., own and/or use) one or more of the client computing devices 140A-140Z, and the client computing devices 140A-140Z may each be owned and utilized by different users at different locations. As used herein, a "user" may refer generally to an individual operator of one or more of the client computing devices 140A-140Z and/or one or more of the shortcode sources 120A-120Z, as well as one or more of the vehicle computing devices 150A-150Z (e.g., a driver of a transportation vehicle).

In some implementations, the user interfaces 142A-142Z may allow their respective client computing devices 140A-140Z to interact directly with one or more of the shortcode sources 120A-120Z (e.g. when shortcode source 120A-120Z is a NFC device). In some implementations, the user interfaces 142A-142Z may allow their respective client computing devices 140A-140Z to interact directly with the transportation server 110. For example, an order request for a transportation vehicle may be transmitted from the client computing device 140A to the transportation server 110, along with location information pertaining to the client computing device 140A.

Each of user interfaces 142A-142Z may allow a user of the respective client computing device 140A-140Z to enter and send a shortcode to the transportation server 110 and receive information from the transportation server 110 in response to providing the shortcode. In one implementation, one or more of the user interfaces 142A-142Z may be a standalone application (e.g., a mobile app), which may have been provided by the transportation server 110 (e.g., as a downloadable application to be installed by an administrator), that allows a user to send and receive information, such as a shortcode, to the transportation server 110. In another example, one or more of the user interfaces 142A-142Z may be a web browser interface that can access, retrieve, present, and/or navigate content (e.g., web pages such as Hyper Text Markup Language (HTML) pages) provided by the transportation server 110. The user interfaces 142A-142Z and their functionality are described in greater detail with respect to FIGS. 5A-5D.

Client computing devices 140A-140Z may include respective network interface device (e.g., as shown in FIG. 8). A network interface device may communicably couple a client computing device to network 105. A processing device (e.g., as shown in FIG. 8), may be operatively coupled to a memory, the display device and the network interface.

As discussed above, a user may first determine and/or obtain a shortcode from shortcode source 120A-120Z. For example, a user may view a sticker on a window at a restaurant XYZ, where the sticker provides a shortcode for navigating to the restaurant (e.g., #toXYZ) and/or navigating from the restaurant (e.g., #fromXYZ). The user may then utilize their client computing device 140A-140Z to enter the obtained shortcode to the user interface 142A-142Z (e.g., the app). The computing device 140A-140Z may receive the shortcode via user interface 142A-142Z rendered on the display device of the computing device 140A-140Z. Using a network interface device, a communication session may be established by the computing device 140A-140Z over network 105. The communication session is established between the computing device 140A-140Z and the transportation server 110 (also referred to herein as a server computing device). The user interface 142A-142Z may then send the shortcode, via the communication session, to the transportation server 110 for processing.

In one implementation, shortcode component 115 of transportation server 110 receives the shortcode. Shortcode component 115 may then provide a functionality, such as an application programing interface (API), to process the shortcode. The API may analyze the shortcode to determine which database should be searched in order to find a matching stored shortcode. For example, the API may dissect the shortcode by parsing the shortcode (e.g., separating out the hashtag from other characters/numbers included in the shortcode). In an example, the API may identify a first character of the shortcode after the hashtag and search a database (e.g., data store 130) based on the first identified character. If the database stores shortcodes in alphabetical or chronological numerical order, then the API can determine which database to search based on the identified first character. The API may employ various other mechanisms/schemes to search appropriate databases for a matching shortcode. When the shortcode component 115 accesses the database (e.g., shortcode data 132 stored in the data store 130) that maintains shortcodes, the shortcode component then identifies corresponding information for each shortcode. The corresponding information may include a list of actions to execute and/or specific content (e.g., an address) associated with the shortcode. For example, when the shortcode component 115 receives a specific shortcode for a location, the shortcode component 115 may look up the shortcode and determine one or more actions to execute. In one implementation, the list of actions includes one or more computer-executable instructions that cause a process to be instantiated on a device. The transportation server 110 may transmit the actions to the client computing device 140A-140Z.

The computing device 140A-140Z may then receive, from the transportation server 110, via the communication session, the list of the actions and the content associated with the shortcode. As discussed above, the list of actions includes computer-executable instructions for the computing device 140A-140Z. Using the computer-executable instructions, the application logic 170A-170Z of computing device 140A-140Z may instantiate a process to generate an order request form using the content without user intervention. For example, the actions may cause the client computing device 140A-140Z to pre-fill, without user intervention, a transportation order request form with an address of the location associated with the shortcode (as determined from shortcode data 132) and display the pre-filled transportation order request form to the user interface 142A-142Z of the client computing device 140A-140Z to the user.

The computing device 140A-140Z may provide for display on the display device, via the user interface 142A-142Z, a graphical representation of the order request form. The computing device 140A-140Z may receive, via the graphical user interface 142A-142Z, a confirmation message with respect to the order request form. The user may confirm the displayed information by selection of a confirmation button. The computing device 140A-140Z may transmit, via the communication session, the order request form to the transportation server 110. The transportation server 110 is to provide a service based on the order request form.

In one implementation, the shortcode includes the list of actions, which may include computer-executable instructions that cause the client computing device 140A-140Z to pre-fill an order request form with certain information (e.g., an origination or destination address, etc). The user may then be responsible for filling in a desired destination location. In another implementation, the shortcode may cause the destination location to be pre-filled on the order screen. The source or pick-up location may then also be automatically pre-filled for the user based on global positioning system (GPS) data associated with the client computing device 140A-140Z. In some implementations, the client computing device 140A-140Z may include global positioning system (GPS) tracking device, which can determine a location of the client computing device 140A-140Z for purposes of pre-filling a location.

In one implementation, a transportation order is placed from the client computing device 140A-140Z using the pre-filled order screen. The transportation order may be routed to the transportation server 110, which, in turn, communicates the transportation order to one or more vehicle computing device 150A-150Z. In one implementation, the vehicle computing devices 150A-150Z may be computing devices (e.g., "driver boxes") that are located on-board transportation vehicles (e.g., as built-in computing devices or separate/portable devices operated by drivers of the transportation vehicles). The vehicle computing devices 150A-150Z may include computing devices such as personal computers (PCs), laptops, mobile phones, smart phones, tablet computers, netbook computers, etc. The vehicle computing devices 150A-150Z may have some or all of the functionality of each of the client computing devices 140A-140Z, and may be configured to exchange data with each other as well as with the transportation server 110, the data store 130, the client computing devices 140A-140Z, and the map data server 160.

A driver operating one of vehicle computing devices 150A-150Z may receive order requests, accept order requests, decline order requests, and/or transfer order requests to other drivers (e.g., other drivers operating vehicle computing devices 150A-150Z). The order requests are dispatched by the transportation server 110 based on the received order request forms (transmitted by client computing device 140A-140Z). In one implementation, the vehicle computing devices 150A-150Z may include GPS tracking devices for tracking locations of their respective transportation vehicles. Location data generated by the GPS tracking devices may be transmitted to the transportation server 110 and utilized, for example, to compute estimate times of arrival. The transportation server 110 may forward the location data of a transportation vehicle to client computing device 140A-140Z in a form of a message. The message may provide tracking information of a location of a vehicle that accepted an order request form. Messages including tracking information may be dynamically provided. For example, the message may be provided periodically. Otherwise, the message may be provided when requested by a user employing client computing device 140A-140Z.

In some implementations, the shortcode is used to provide functionality other than transportation ordering. For example, the shortcode may be used to automate a process to provide a coupon (e.g., an account credit or discount) for transportation and/or other services to a user. In other implementations, the shortcode is used to automate specific ordering details for services other than on-demand transportation, such as food delivery.

A user may create a shortcode to be used by other users. For example, a user may be a merchant that creates a shortcode to provide discounts or attract customers to the merchant's place of business. In another example, a user may wish to create a shortcode of a secret location to an event. The user may wish to invite selected guests to the event and may provide a shortcode to friends so that they may order a vehicle to transport them to and from the event. In yet another example, a user may wish to create a shortcode providing free or discounted rides to an event to his/her friends.

A user may use an application (e.g., app) on his/her smart phone (e.g., client computing device 140A-140Z) to create a shortcode. A first communication session may be established, over network 105, between the transportation server 110 and the client computing device 140A-140Z. The transportation server may receive, via the first communication session, identifying data corresponding to a first shortcode. The identifying data may be transmitted by a first client computing device (e.g., client computing device 140A).

The transportation server 110 may receive a request to associate the first shortcode with an action and content. The request may be transmitted by the first client computing device.

The transportation server 110 may generate an entry for the first shortcode in a listing of shortcodes maintained in a data store 130. The transportation server 110 may associate the action and the content with the first shortcode in the generated entry. The shortcode is then created and a user employing client computing device 140A may distribute the shortcode to one or more users.

When another user (or the same user) wishes to use the shortcode, a second communication session may be established over network 105 between the transportation server 110 and a second client computing device (e.g., 140Z). The transportation server 110 receives, via the second communication session, a second shortcode from the second client computing device.

The transportation server 110 references, with the received second shortcode, the listing of shortcodes maintained in the data store of the transportation server 110. The transportation server 110 identifies, in the listing, a match between the received second shortcode and the first shortcode maintained in the listing.

In response to identifying the match, the transportation server 110 transmits, via the second communication session, the action and the content associated with the first shortcode to the second client computing device. The action includes a computer-executable instruction to cause the second client computing device to instantiate a process on the second client computing device to generate an order request form using the content without user intervention and cause the second client computing device to display a graphical representation of the order request form to a user.

The transportation server 110 receives, via the second communication session, the order request form from the second client computing device. The order request form includes a request for a service of the server computing device.

In one implementation, the data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers), and may be cloud-based. In some implementations, the data store 130 may be a part of the transportation server 110. In some implementations, the data store 130 may be distributed among and accessible to one or more of the shortcode sources 120A-120Z, the transportation server 110, one or more of the client computing devices 140A-140Z, one or more of the vehicle computing devices 150A-150Z, and/or the map data server 160. One or more of the devices of the system architecture 100 may utilize the data store 130 to store public and private data. The data store 130 may be configured to provide secure storage for private data.

In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, the network 105 may be a combination of different types of networks. In one implementation, one or more of the client computing devices 140A-140Z may communicate directly with one or more of the shortcode sources 120A-120Z. For example, the client computing device 140A may include a Bluetooth device that sends/receives data to/from the shortcode source 120A.

Figure 2:
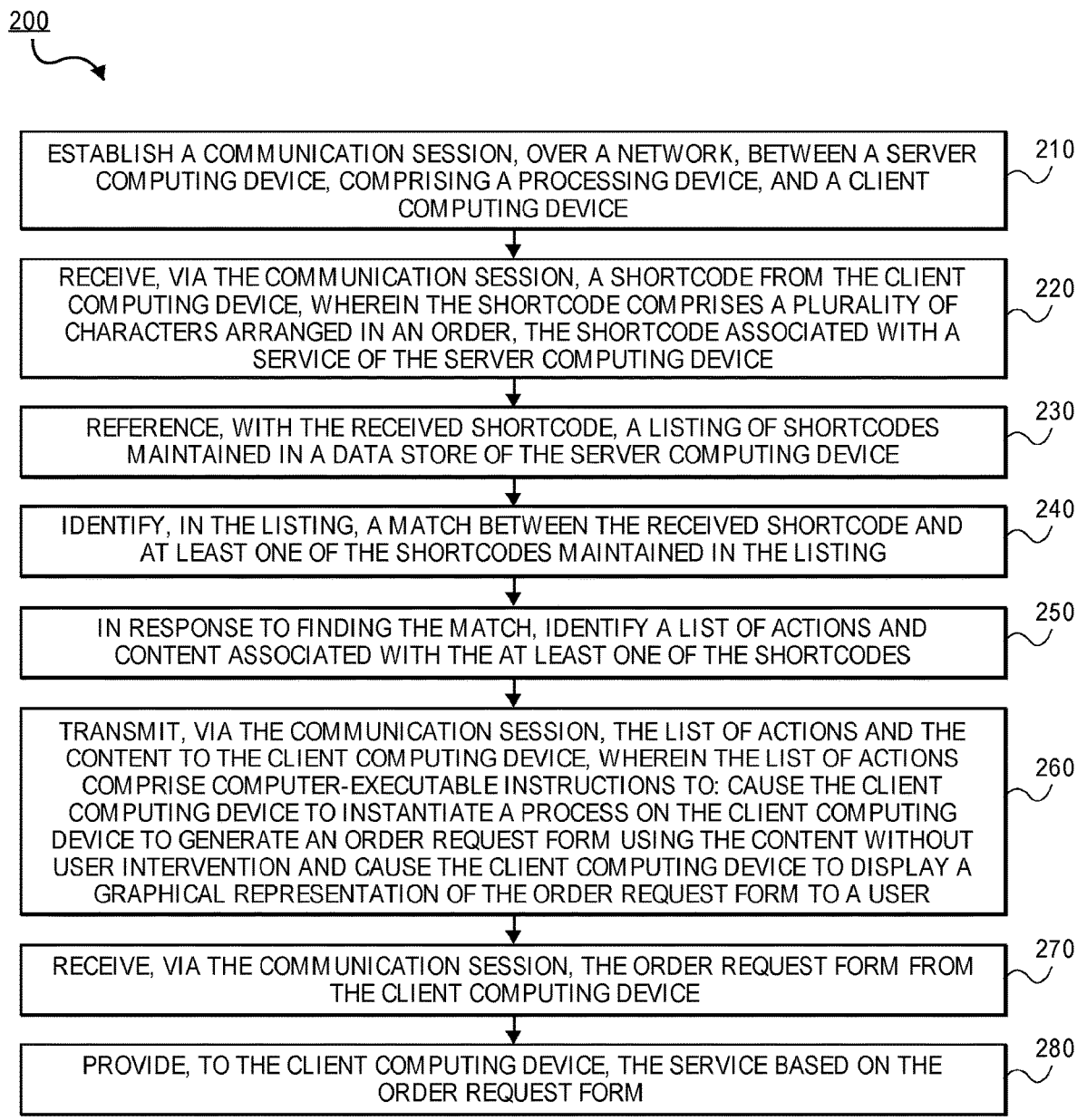
FIG. 2 is a flow diagram illustrating a method for providing a service using an order request form according to an embodiment of the disclosure.

FIG. 2 is a flow diagram illustrating a method 200 for providing a service using an order request form according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by shortcode component 115 of FIG. 1.

Method 200 begins at block 210 where a communication session is established over a network. The communication session is between a server computing device, including a processing device, and a client computing device.

At block 220, a shortcode is received from the client computing device via the communication session. The shortcode includes multiple characters arranged in an order. The shortcode is associated with a service of the server computing device. The shortcode may include multiple textual characters (i.e., alphanumeric characters) and numbers.

At block 230, the received shortcode is referenced with a listing of shortcodes maintained in a data store of the server computing device.

At block 240, in the listing, a match between the received shortcode and at least one of the shortcodes maintained in the listing is identified. Subsequently, at block 250, in response to finding the match, a list of actions and content associated with the at least one of the shortcodes is identified.

At block 260, the list of actions and the content are transmitted, via the communication session, to the client computing device. The list of actions include computer-executable instructions to cause the client computing device to instantiate a process on the client computing device to generate an order request form using the content without user intervention. The computer-executable instructions also cause the client computing device to display a graphical representation of the order request form to a user.

The order request form may include a geographical location corresponding to an origination address or a destination address. In an implementation, the geographical location may be determined by the client computing device or associated with the shortcode (e.g., the address of a merchant).

At block 270, the order request form is received from the client computing device via the communication session. Lastly, at block 280, the service based on the order request form is provided to the client computing device.

In an implementation, at block 280, the providing of the service further includes dispatching a transportation vehicle to a user based on the geographical location. In another implementation, the providing of the service further includes providing a discount for dispatching the transportation vehicle. The discount may be determined based on the shortcode and stored in the data store.

In an implementation, an action of the list of actions includes input of identifying data into the order request form. The identifying data may include a name of the shortcode (e.g., a tag ID), a name of the location, an address of the location, notes associated with the location, contact information such as a phone number for the location, and geographical coordinates (latitude, longitude) of the location, to name a few examples.

In an implementation, at block 280, the providing of the service further includes establishing a second communication session with a merchant computing device transmitting, via the second communication session, the order request form to the merchant computing device.

In an implementation, the characters of the shortcode include a hashtag accompanied by a predefined number of at least one of a string of textual characters or numbers.

In an implementation, the order request form may be routed to multiple vehicle computing devices based on at least one of the list of actions or the content.

In an implementation, a user interface is provided to a second client computing device for creating the shortcode. Identifying data corresponding to the shortcode is received via the user interface. The identifying data includes the list of actions and the content. An entry is generated for the shortcode in the listing of shortcodes. The list of actions and the content are associated with the shortcode in the generated entry. A conformation message in regard to creation of the shortcode is provided to the second client computing device.

Figure 3:
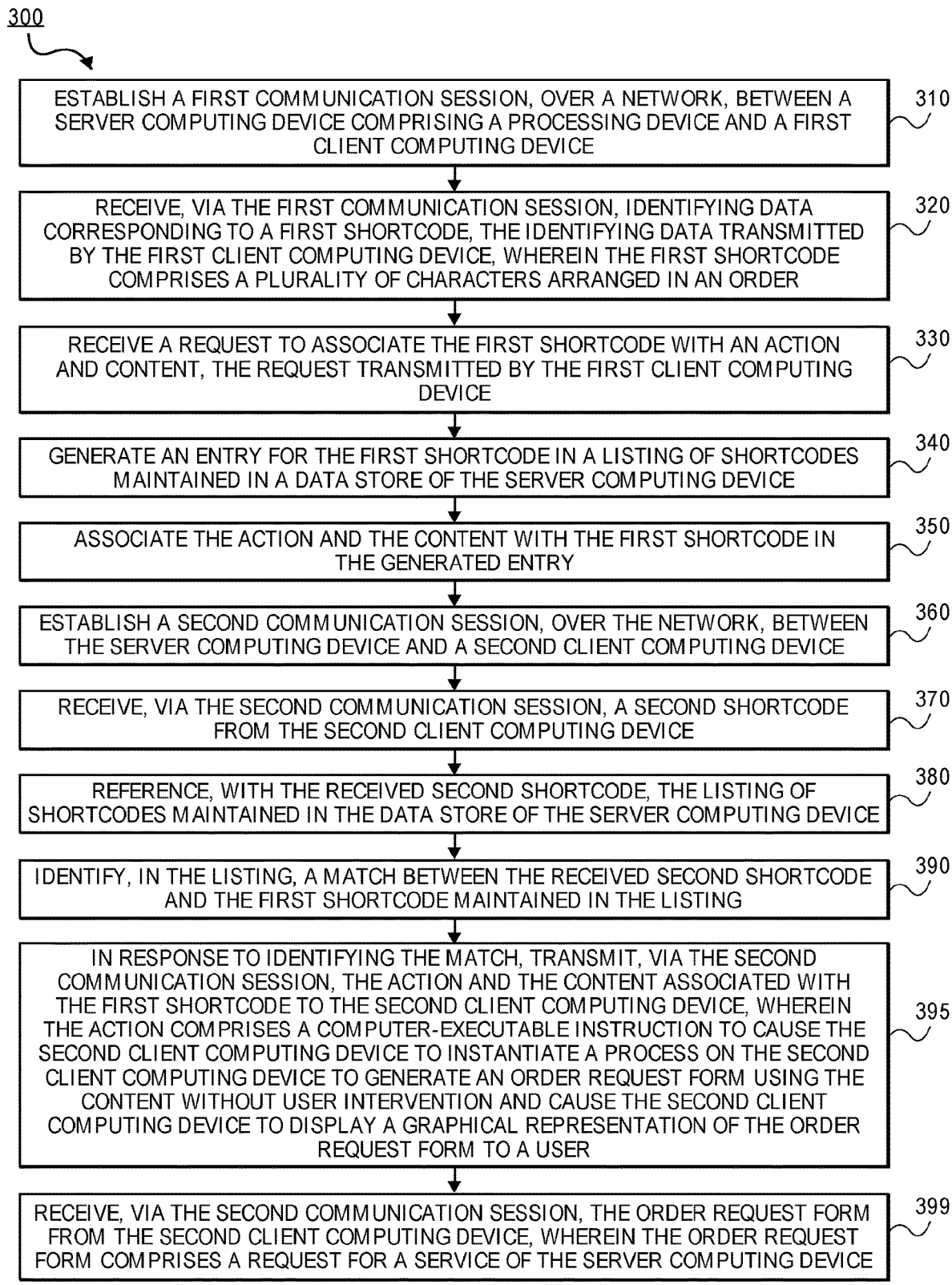
FIG. 3 is a flow diagram illustrating a method for creating a shortcode in a transportation server and providing a service using an order request form in response to receiving the shortcode, according to an embodiment of the disclosure.

FIG. 3 is a flow diagram illustrating a method 300 for creating a shortcode in a transportation server and providing a service using an order request form in response to receiving the shortcode, according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by shortcode component 115 of FIG. 1.

Method 300 begins at block 310 where a first communication session is established, over a network, between a server computing device including a processing device and a first client computing device. Then, at block 320, identifying data corresponding to a first shortcode is received via the first communication session. The identifying data is transmitted by the first client computing device. The first shortcode includes multiple characters arranged in an order. In one implementation, the identifying data includes a name of the shortcode (e.g., a tag ID), a name of the location, an address of the location, notes associated with the location, contact information such as a phone number for the location, and geographical coordinates (latitude, longitude) of the location, to name a few examples.

At block 330, a request to associate the first shortcode with an action and content is received. The request is transmitted by the first client computing device.

At block 340, an entry for the first shortcode is generated in a listing of shortcodes maintained in a data store of the server computing device. At block 350, the action and the content are associated with the first shortcode in the generated entry.

At block 360, a second communication session is established, over the network, between the server computing device and a second client computing device. At block 370, a second shortcode sent from the second client computing device is received via the second communication session. At block 380, the listing of shortcodes maintained in the data store of the server computing device is referenced with the received second shortcode.

At block 390, in the listing, a match between the received second shortcode and the first shortcode maintained in the listing is identified. At block 395, in response to identifying the match, the action and the content associated with the first shortcode are transmitted, via the second communication session, to the second client computing device. The action includes a computer-executable instruction to cause the second client computing device to instantiate a process on the second client computing device to generate an order request form using the content without user intervention. The computer-executable instruction also causes the second client computing device to display a graphical representation of the order request form to a user.

Lastly, at block 399, the order request form, sent from the second client computing device, is received via the second communication session. The order request form includes a request for a service of the server computing device.

Figure 6A:
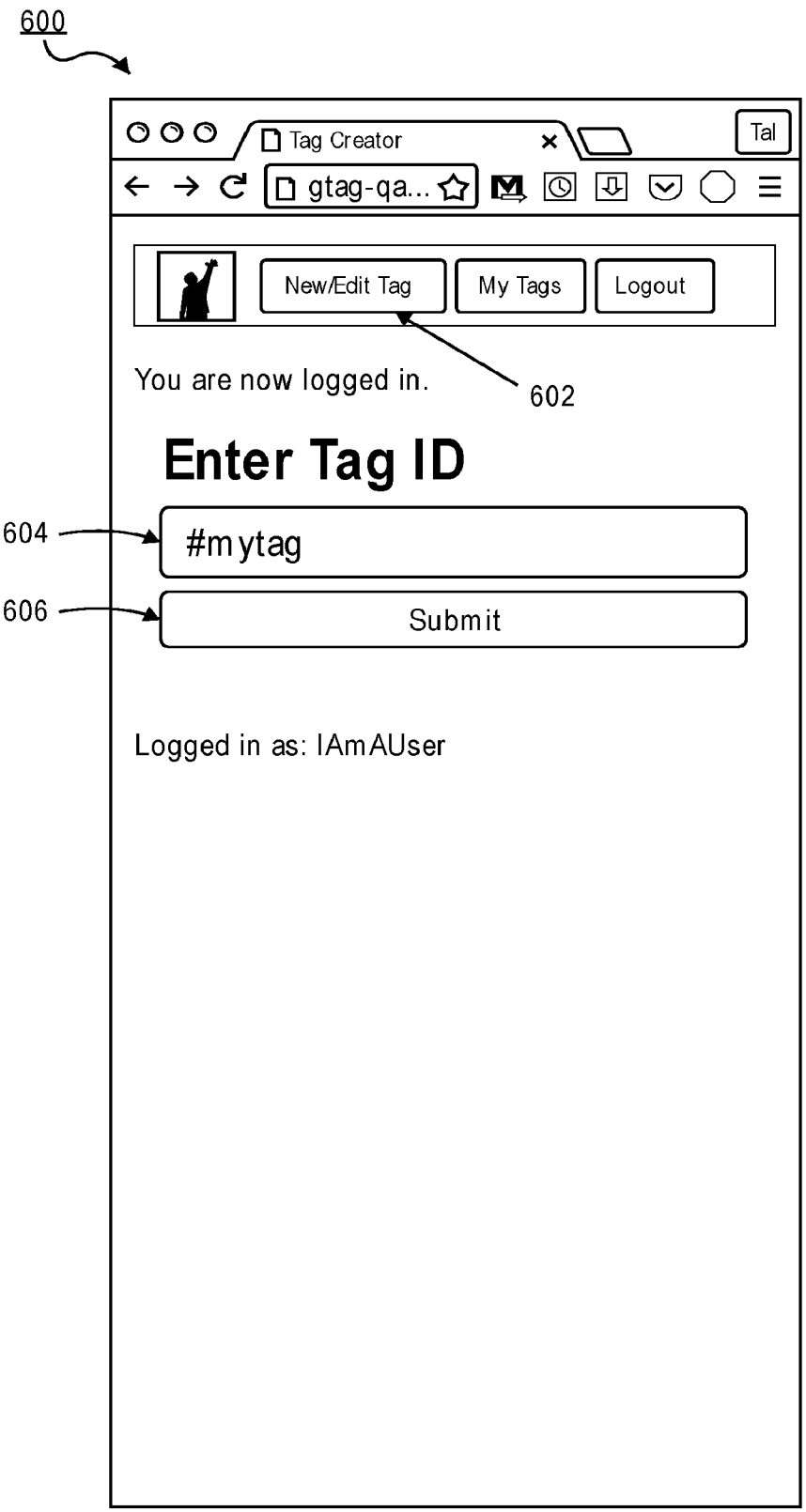
FIG. 6A illustrates an exemplary GUI window for creating a shortcode to automate an application process, according to an implementation of the disclosure
Figure 6B:
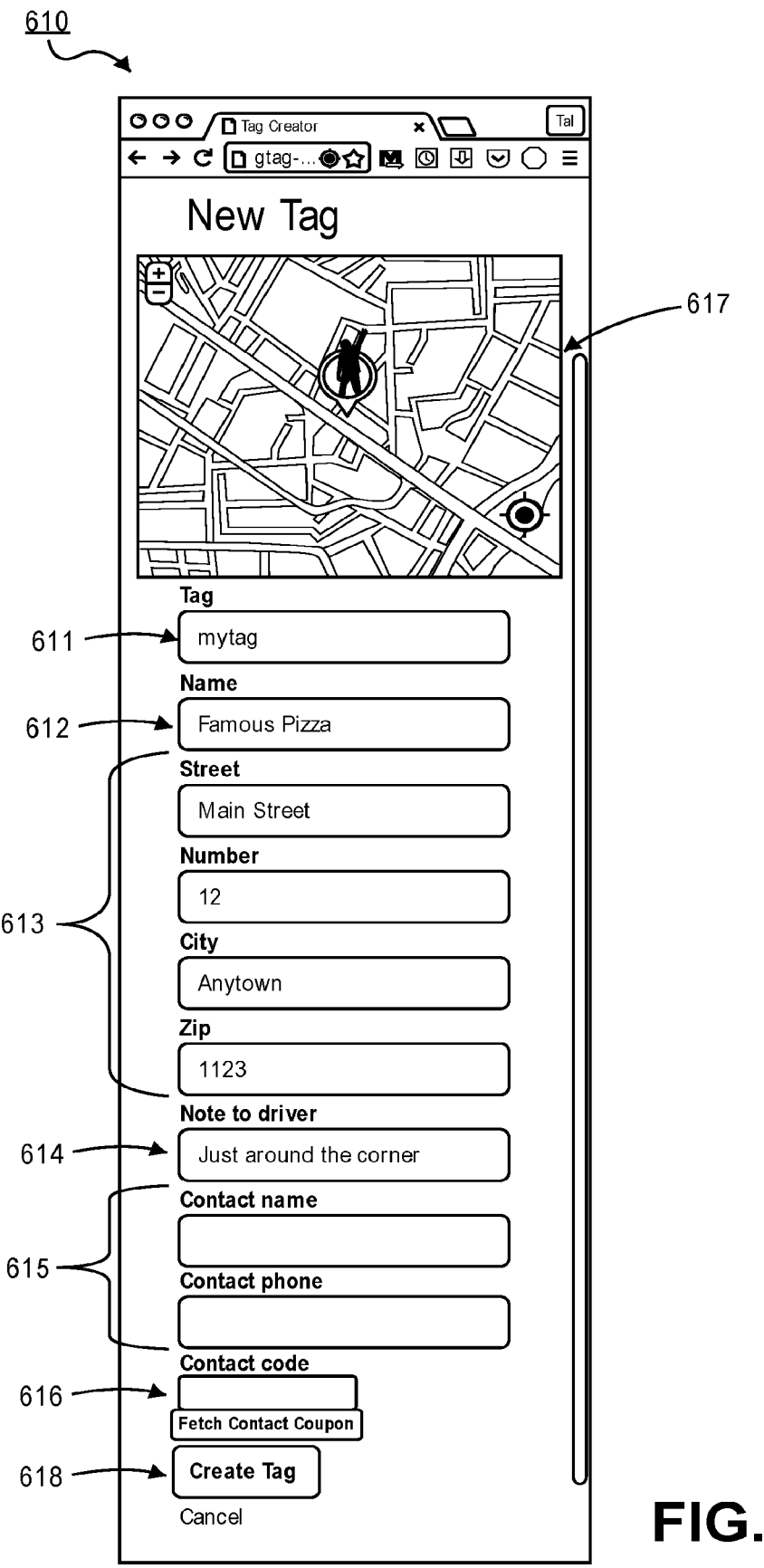
FIG. 6B illustrates an exemplary GUI window of a shortcode creation screen for entering identifying information for a new shortcode, according to an implementation of the disclosure.
Figure 6C:
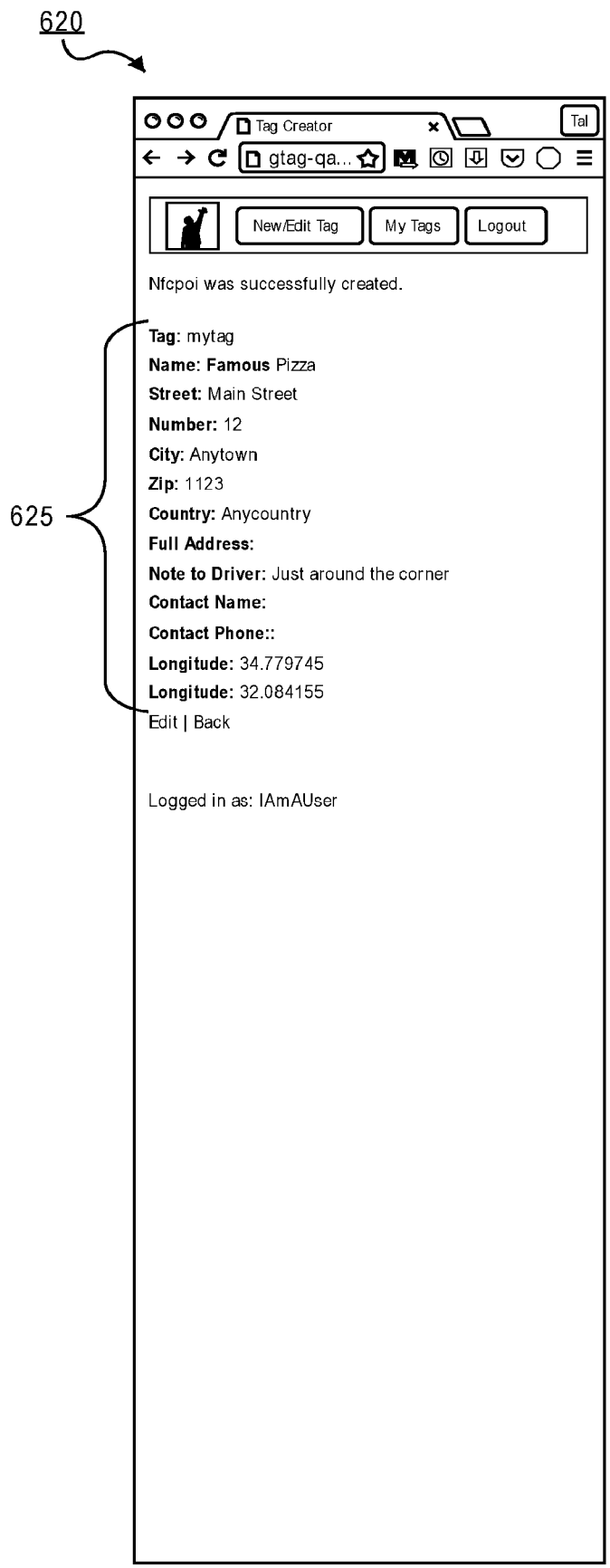
FIG. 6C illustrates an exemplary GUI window for providing and confirming details associated with creation of a new shortcode, according to an implementation of the disclosure.

In one implementation, FIGS. 6A through 6C illustrate exemplary screenshots of a user interfaces for creating a shortcode.

Figure 4:
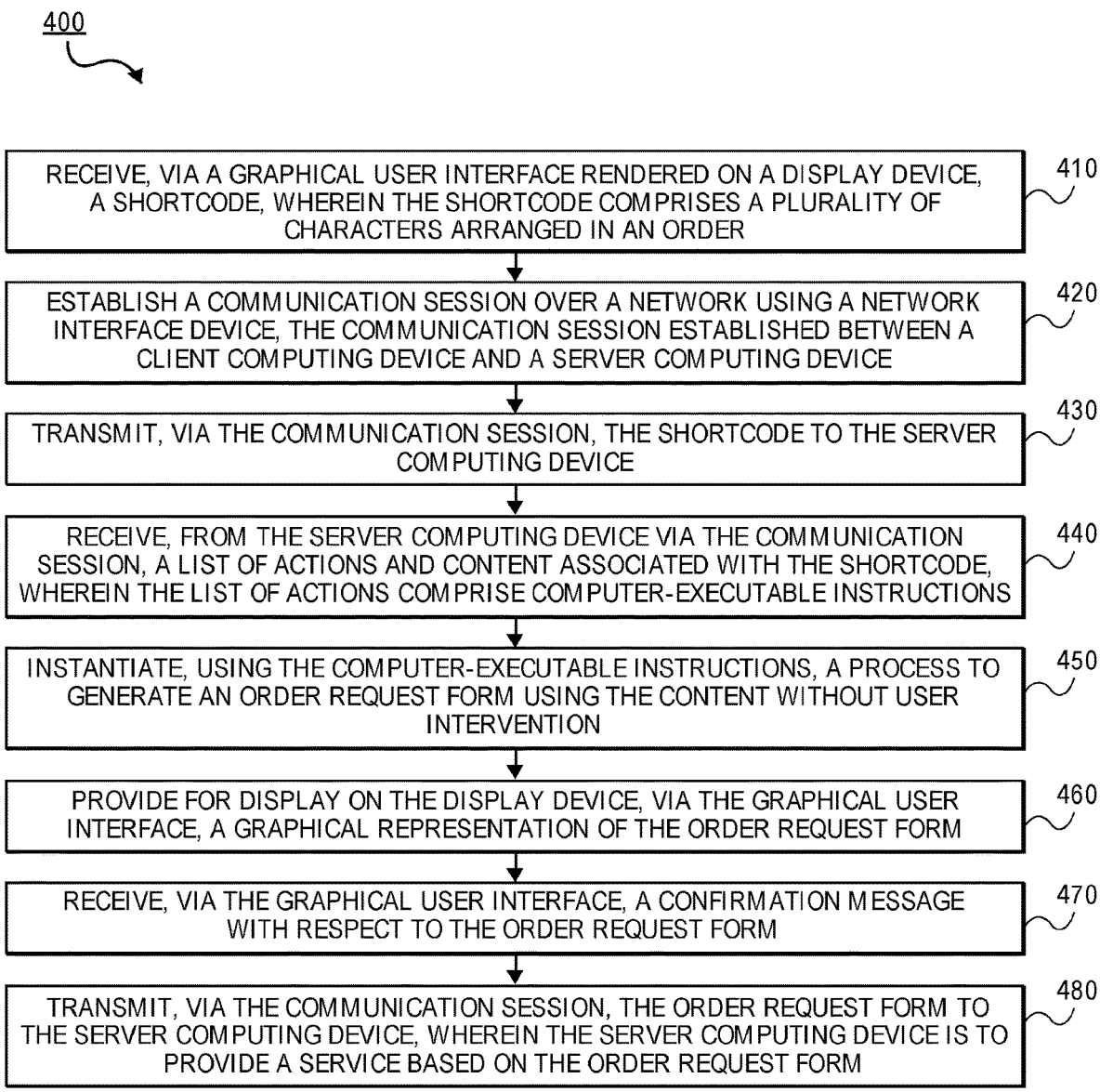
FIG. 4 is a flow diagram illustrating a method for automating an application process to generate an order request form using a shortcode at a client computing device according to an embodiment of the disclosure.

FIG. 4 is a flow diagram illustrating a method 400 for automating an application process to generate an order request form using a shortcode at a client computing device according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by client computing device 140A-140Z of FIG. 1.

Method 400 begins at block 410 where a shortcode is received via a graphical user interface rendered on a display device. The shortcode includes multiple characters arranged in an order. The graphical user interface is an application executing on the client computing device, where the application provides on-demand services (e.g., transportation, delivery, etc.). In one implementation, the graphical user interface receives the shortcode input by a user employing client computing device 140A-140Z.

At block 420, a communication session is established, over a network, using a network interface device. The communication session is established between a client computing device and a server computing device (e.g., transportation server 110).

At block 430, the shortcode is transmitted, via the communication session, to the server computing device. At block 440, a list of actions and content associated with the shortcode are received from the server computing device via the communication session. The list of actions includes computer-executable instructions.

At block 450, using the computer-executable instructions, a process is instantiated to generate an order request form using the content without user intervention. At block 460, a graphical representation of the order request form is provided for display on the display device, via the graphical user interface.

At block 470, a confirmation message with respect to the order request form is received via the graphical user interface. Lastly, at block 480, the order request form is transmitted, via the communication session, to the server computing device. The server computing device is to provide a service based on the order request form.

In an implementation, based on the computer-executable instructions, a discount is applied to the service provided by the server computing device. A graphic representing an amount of the discount applied to the service is provided for display via the graphical user interface.

In an implementation, a first message, sent from the server computing device, is received. The first message indicates that the service is dispatched according to the order request form. The first message is provided for display via the graphical user interface. A second message, sent from the server computing device, is received. The second message provides tracking information of a location of a vehicle associated with the dispatched service. The second message is provided for display via the graphical user interface.

Figure 5A:
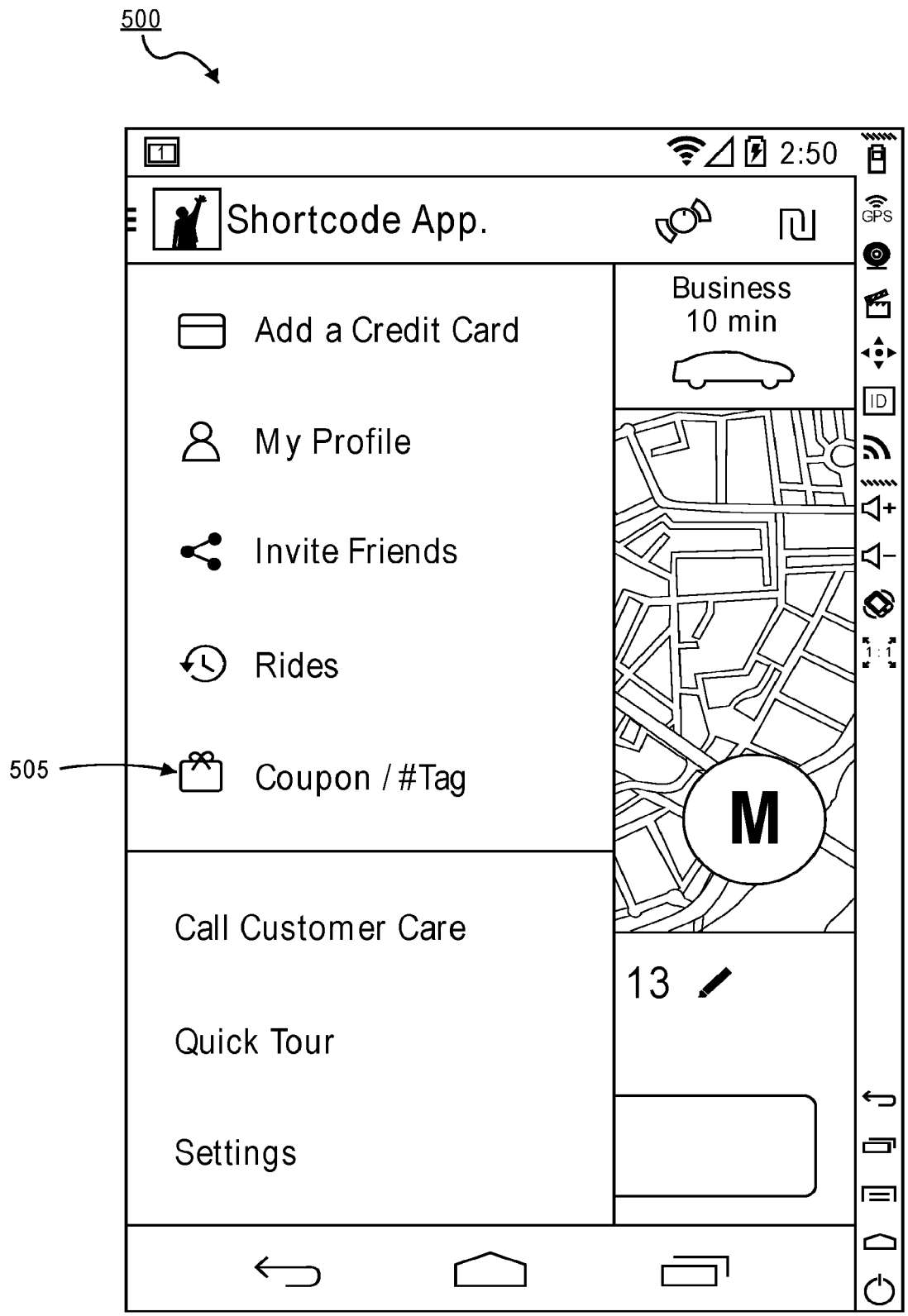
FIG. 5A illustrates an exemplary graphical user interface (GUI) window for using a shortcode to automate an application process, according to an implementation of the disclosure.

FIG. 5A illustrates an exemplary graphical user interface (GUI) window 500 for using a shortcode to automate an application process, namely the process of ordering a transportation vehicle, according to an implementation of the disclosure. The GUI window 500 includes an options menu that may be performed in an on-demand transportation application executing on a client computing device. The options menu may include a coupon/#Tag option 505. When the coupon/#Tag option 505 is selected, a shortcode function of the application may be accessed.

Figure 5B:
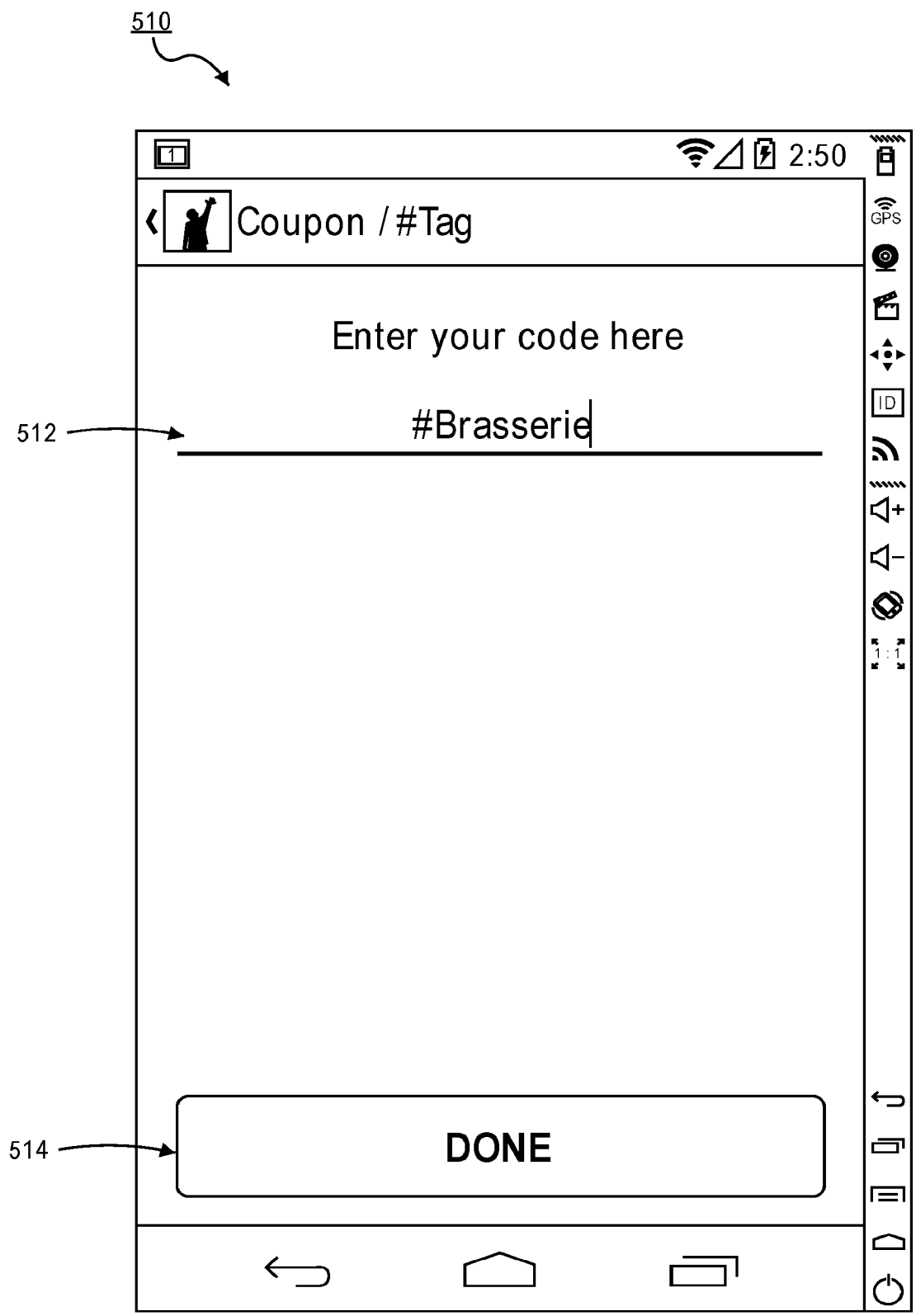
FIG. 5B illustrates an exemplary GUI window of a shortcode screen for automating an application process, according to an implementation of the disclosure.

FIG. 5B illustrates an exemplary GUI window 510 of a shortcode screen for automating an application process, namely the process of ordering a transportation vehicle, according to an implementation of the disclosure. The GUI window 510 includes a shortcode entry box 512 for entering a shortcode. When the shortcode is entered into the shortcode entry box 512, a done button 514 may be selected to submit the shortcode. In one implementation, when the done button 514 is selected, text entered into shortcode entry box 512 is submitted to a transportation server.

Figure 5C:
FIG. 5C illustrates an exemplary GUI window for using a shortcode to obtain a coupon or other credit/discount, according to an implementation of the disclosure.

FIG. 5C illustrates an exemplary GUI window 520 for using a shortcode to obtain a coupon or other credit/discount, according to an implementation of the disclosure. The GUI window 520 includes a coupon result window 522 displaying a result of processing a shortcode that resulted in a coupon (e.g., a credit) being applied to an order in the application executing on the client computing device displaying the GUI window 520.

Figure 5D:
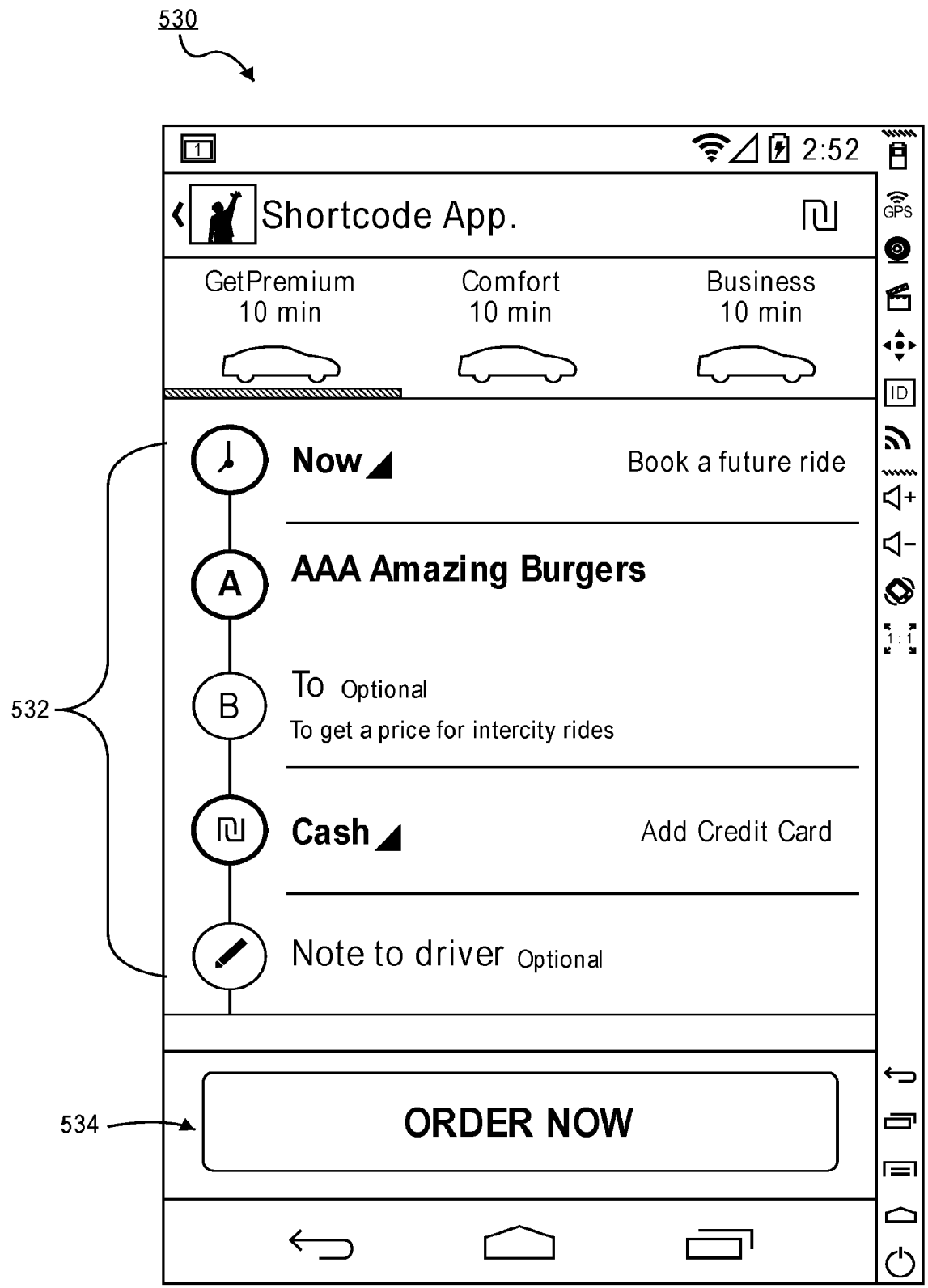
FIG. 5D illustrates an exemplary GUI window for providing a result of using a shortcode to automate an application process, according to an implementation of the disclosure.

FIG. 5D illustrates an exemplary GUI window 530 for providing a result of using a shortcode to automate an application process, namely the process of ordering a transportation vehicle, according to an implementation of the disclosure. The GUI window 530 includes a transportation order screen that is pre-filled with location information 532 specific to a shortcode. In one implementation, the location information 532 pre-filled in GUI window 530 may be the result of using the shortcode entered into shortcode entry box 512 of FIG. 5B. An order now button 534 may be selected to submit the pre-filled transportation order to a transportation server for order processing.

FIG. 6A illustrates an exemplary GUI window 600 for creating a shortcode to automate an application process, namely the process of ordering a transportation vehicle, according to an implementation of the disclosure. The GUI window 600 includes a new/edit tag button 602 that when selected causes the GUI 600 to present a tag ID entry box 604. An identifier of a new shortcode may be entered into the tag ID entry box 604 and a submit button 606 selected to cause a process to create a new shortcode with the entered shortcode identifier to be started.

FIG. 6B illustrates an exemplary GUI window 610 of a shortcode creation screen for entering identifying information for a new shortcode, according to an implementation of the disclosure. The GUI window 610 includes a shortcode identifier box 611, which may be filled with an identifier for a new shortcode (e.g., as entered into GUI 600 described with respect to FIG. 6A). GUI window 610 also include text entry boxes for entering in identifying information associated with the shortcode identifier, including but not limited to, a location name box 612, address boxes 613, a notes box 614, contact information boxes 615, and coupon identifying information 616. IN addition, GUI window 610 may include a map display 617 showing a geographical location associated with the new shortcode. In one implementation, the geographical location may be adjusted via manipulation actions within the map display 617 of GUI window 610. When all identifying information to associate with a new shortcode has been entered via the GUI window 610, a create tag button 618 may be selected to cause the new shortcode to be created and stored.

FIG. 6C illustrates an exemplary GUI window 620 for providing and confirming details associated with creation of a new shortcode, according to an implementation of the disclosure. The GUI window 620 includes a shortcode details section 625 displaying identifying information inputted and stored for a new shortcode.

Figure 7:
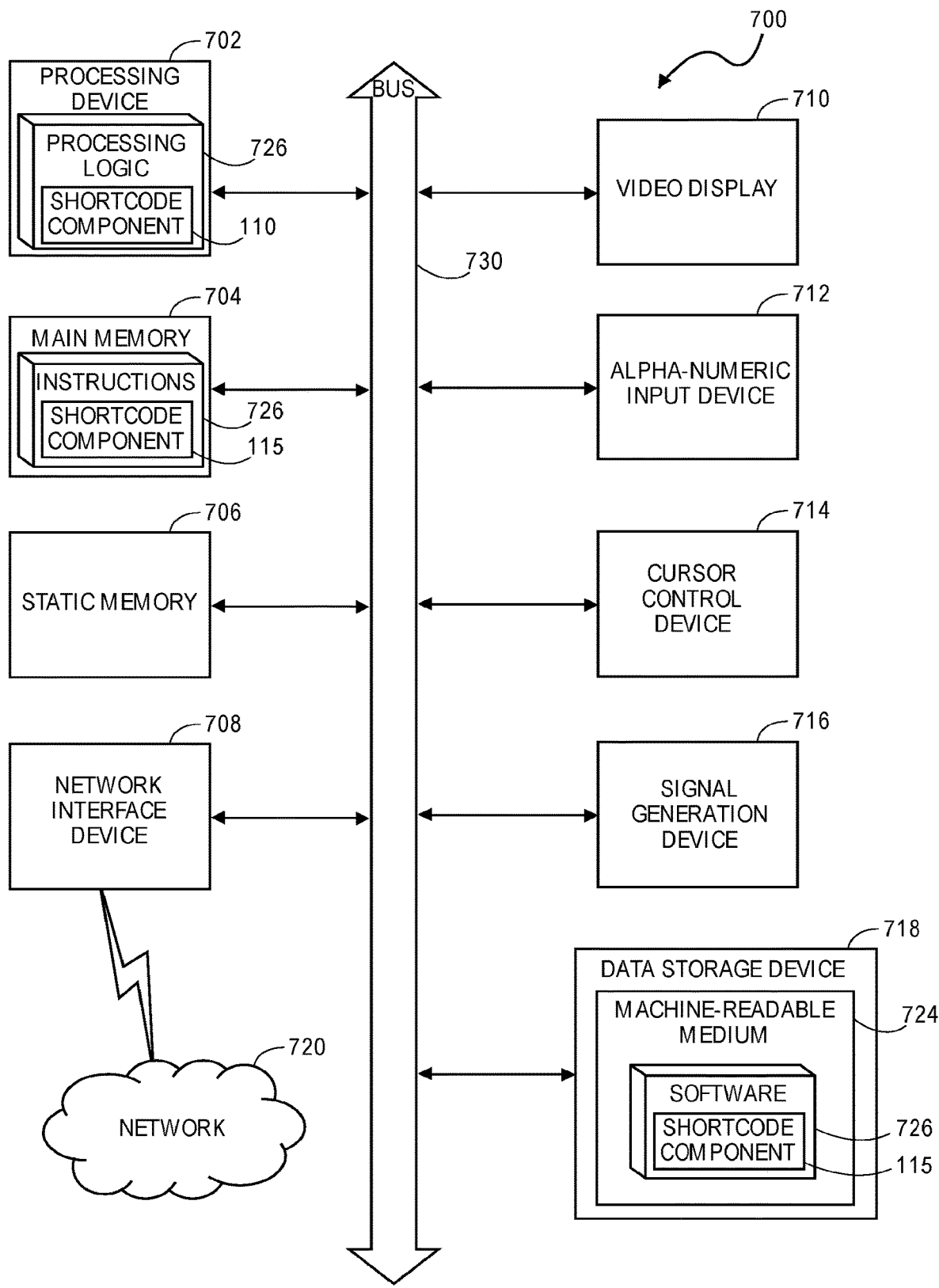
FIG. 7 illustrates a diagrammatic representation of a machine in the example form of a computer system, in accordance with an implementation of the disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730. The processing device 702 may be operatively coupled to the main memory 704.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium (or machine-readable medium) 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 to implement a shortcode component 115 to automate application processes using a shortcode and/or a software library containing methods that call the above applications, such as shortcode component 115 described with respect to FIG. 1. While the machine-accessible storage medium 724 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

FIG. 8 illustrates a diagrammatic representation of another machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830. The processing device 802 may be operatively coupled to the main memory 804.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808 communicably coupled to a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium (or machine-readable medium) 824 on which is stored software 826 embodying any one or more of the methodologies of functions described herein. The software 826 may also reside, completely or at least partially, within the main memory 804 as instructions 826 and/or within the processing device 802 as processing logic 826 during execution thereof by the computer system 800; the main memory 804 and the processing device 802 also constituting machine-accessible storage media.

The machine-readable storage medium 824 may also be used to store instructions 826 to implement an application logic 170 to create a shortcode and/or process a shortcode to create an order request form, such as application logic 170A-170Z described with respect to FIG. 1. While the machine-accessible storage medium 824 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method for providing a transportation service using an order request form, the method comprising:
responsive to receiving a shortcode comprising a plurality of characters arranged in an order from a client computing device, identifying, by a processing device based on one or more corresponding characters of the plurality of characters of the shortcode, each of: data content comprising one or more geographical locations; and computer-executable instructions configured to operate on the data content;

causing, based on the data content and the computer-executable instructions, the client computing device to instantiate a process on the client computing device to generate the order request form filled with the one or more geographical locations received from the processing device based on the shortcode without user intervention and without user input of the one or more geographical locations; and responsive to receiving the order request form filled with the one or more geographical locations from the client computing device, transmitting, by the processing device to a vehicle computing device, an order request to dispatch a transportation vehicle associated with the vehicle computing device to provide the transportation service to a user of the client computing device based on the order request form.

2. The method of claim 1, wherein the shortcode is associated with the transportation service, and wherein the transportation service is associated with the one or more geographical locations.

3. The method of claim 1, wherein the one or more geographical locations comprises a destination location, and wherein providing the transportation service comprises providing, via the transportation vehicle, transportation to the destination location.

4. The method of claim 1, wherein the one or more geographical locations comprises a pick-up location, wherein providing the transportation service comprises providing, via the transportation vehicle, transportation from the pick-up location.

5. The method of claim 1, wherein the one or more geographical locations comprises a pick-up location and a destination location, wherein the client computing device is to generate the order request form filled with the pick-up location and the destination location without user intervention and without user input of the pick-up location and without user input of the destination location.

6. The method of claim 1 further comprising identifying, based on the shortcode, identifying data, wherein the client computing device is to generate the order request form filled with the identifying data without user intervention and without user input of the identifying data.

7. The method of claim 1, wherein the transportation service is to transport the user from a pick-up location to a destination location.

8. The method of claim 1, wherein the transportation service is to deliver a product.

9. The method of claim 1, wherein the transportation service is to transport one or more users to an event.

10. The method of claim 1, wherein the plurality of characters of the shortcode comprises a hashtag accompanied by a predefined number of at least one of a string of textual characters or numbers.

11. A non-transitory computer readable storage medium comprising instructions that, when executed by a processing device, cause the processing device to:

receive, from a first client computing device, a first shortcode and a request to associate the first shortcode with computer-executable instructions and one or more geographical locations, wherein the first shortcode comprises a plurality of characters arranged in an order;

associate the computer-executable instructions and the one or more geographical locations with the first shortcode in an entry for the first shortcode in a listing of shortcodes maintained in a data store;

responsive to receiving the first shortcode from a second client computing device, identify, based on one or more corresponding characters of the plurality of characters of the first shortcode, each of: data content comprising the one or more geographical locations; and the computer-executable instructions to operate on the data content;

cause, based on the data content and the computer-executable instructions, the second client computing device to instantiate a process on the second client computing device to generate an order request form filled with the one or more geographical locations received from the processing device based on the first shortcode without user intervention and without user input of the one or more geographical locations; and responsive to receiving the order request form filled with the one or more geographical locations from the second client computing device, transmit, to a vehicle computing device, an order request to dispatch a transportation vehicle associated with the vehicle computing device to provide a transportation service to a user of the second client computing device based on the order request form.

12. The non-transitory computer readable storage medium of claim 11, wherein the first shortcode is associated with the transportation service, wherein the transportation service is associated with the one or more geographical locations.

13. The non-transitory computer readable storage medium of claim 11, wherein the one or more geographical locations comprises a destination location, wherein providing the transportation service comprises providing, via the transportation vehicle, transportation to the destination location.

14. The non-transitory computer readable storage medium of claim 11, wherein the one or more geographical locations comprises a pick-up location, wherein providing the transportation service comprises providing, via the transportation vehicle, transportation from the pick-up location.

15. The non-transitory computer readable storage medium of claim 11, wherein the one or more geographical locations comprises a pick-up location and a destination location, wherein the second client computing device is to generate the order request form filled with the pick-up location and the destination location without user intervention and without user input of the pick-up location and without user input of the destination location.

16. The non-transitory computer readable storage medium of claim 11, wherein the processing device is further to identify, based on the first shortcode, identifying data, wherein the second client computing device is to generate the order request form filled with the identifying data without user intervention and without user input of the identifying data.

17. A client computing device comprising:

a memory; and a processing device, operatively coupled to the memory, to:

receive a shortcode comprising a plurality of characters arranged in an order;

transmit, to a server computing device, the shortcode, wherein each of data content and computer-executable instructions are to be determined based on one or more corresponding characters of the plurality of characters of the shortcode, the data content comprising one or more geographical locations, the computer-executable instructions being configured to operate on the data content;

responsive to transmitting the shortcode to the server computing device, receive, from the server computing device, each of: the data content comprising the one or more geographical locations; and the computer-executable instructions configured to operate on the data content;

initiate, using the data content and the computer-executable instructions, a process on the client computing device to generate an order request form filled with the one or more geographical locations received from the processing device based on the shortcode without user intervention and without user input of the one or more geographical locations; and responsive to receiving a confirmation message with respect to the order request form, transmit, the order request form filled with the one or more geographical locations to the server computing device, wherein the server computing device is to transmit an order request to a vehicle computing device to dispatch a transportation vehicle associated with the vehicle computing device to provide a transportation service to a user of the client computing device based on the order request form, the transportation service being associated with the shortcode and the one or more geographical locations.

18. The client computing device of claim 17, wherein receiving the shortcode is via a graphical user interface displayed via the client computing device.

19. The client computing device of claim 17, wherein the one or more geographical locations comprises a pick-up location and a destination location, wherein the client computing device is to generate the order request form filled with the pick-up location and the destination location without user intervention and without user input of the pick-up location and without user input of the destination location.

20. The client computing device of claim 17, wherein the processing device is further to identify, based on the shortcode, identifying data, wherein the client computing device is to generate the order request form filled with the identifying data without user intervention and without user input of the identifying data.

* * * * *